No. 764,132. PATENTED JULY 5, 1904.
C. W. KELSEY.
DETACHABLE FLANGE FOR RUBBER TIRES.
APPLICATION FILED APR. 26, 1904.
NO MODEL.
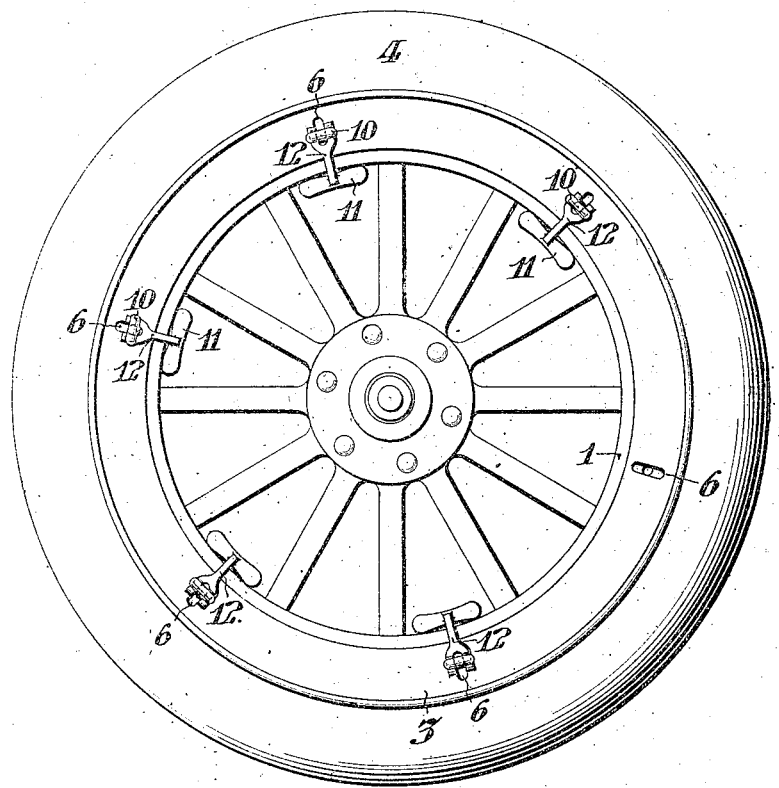
FIG. I.
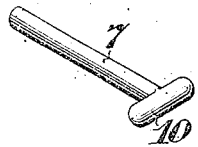
FIG. IV.
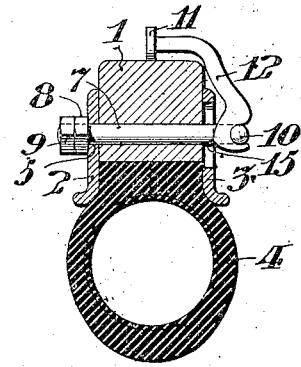
FIG. II.
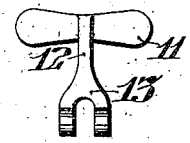
FIG. III.
WITNESSES:
Clifton C. Hallowell
John C. Bergner
INVENTOR:
CADWALLADER W. KELSEY,
by his attorneys
Paige Paul + Foley No. 764,132. Patented July 5, 1904.

UNITED STATES PATENT OFFICE.

CADWALLADER W. KELSEY, OF PHILADELPHIA, PENNSYLVANIA.

DETACHABLE FLANGE FOR RUBBER TIRES.

SPECIFICATION forming part of Letters Patent No. 764,132, dated July 5, 1904.

Application filed April 26, 1904. Serial No. 204,938. (No model.)

*To all whom it may concern:*

Be it known that I, CADWALLADER W. KELSEY, residing at Chestnut Hill, in the city of Philadelphia, county of Philadelphia, and State of Pennsylvania, have invented certain new and useful Improvements in Detachable Flanges for Rubber Tires, whereof the following is a specification, reference being had to the accompanying drawings.

Wheels for rubber-tired vehicles have heretofore been constructed with two detachable metal flanges, one on either side of the felly of the wheel, projecting beyond the tread of the felly, and thus forming around the periphery of the wheel a groove for the retention of the rubber tire. In order to put on or take off the tire, it is necessary to remove one of these flanges, and for this purpose they have been secured to the wheel by bolts running through the felly, and in order to remove the flanges it has been necessary to unscrew the bolts.

My invention relates to a fastening device for securing the flanges by means of which the flange may be removed or refastened in place much more rapidly than where bolts must be unscrewed.

In the accompanying drawings, Figure I represents in elevation a rubber-tired wheel fitted with devices embodying my invention, one of said devices being removed. Fig. II is an enlarged cross-section through the felly and the tire of such a wheel, exhibiting in detail my method of securing the detachable flanges. Fig. III is a detail view of the clamp which forms part of my invention. Fig. IV is a detail view of the T-headed bolt employed in connection with this clamp.

1 is the felly of the wheel.

2 and 3 are the detachable flanges, secured one on either side of the felly and between the projecting ends of which rests the rubber tire 4, which cannot be removed from the wheel or replaced thereupon except after removal of one of the flanges.

One of the flanges, 2, (preferably the inner one,) is provided at intervals with bolt-holes 5. The other flange, 3, is provided at similar intervals with radial slots 6. Between these the felly is pierced to receive bolts 7. Each bolt is provided on the side of the flange 2 with a nut 8 and a jam-nut 9. On the other end of each bolt in place of the usual head I provide a T-head 10, as seen in Fig. IV.

The clamp shown in Fig. III consists of a handle 11, a curved stem 12, and a yoke 13, the two arms of which are similarly curved, as seen in Fig. II, so that while the yoke 13 straddles the bolt the curved arms each embrace one end of the cross-piece of the T-head. The side of each of these curved arms which is adjacent to the flange 3 is provided with a cam-surface 15, so curved that when the clamp is in the position of Fig. II the extreme extension of the cam is below the center line of the bolt 7, whereby the tension of the bolt tends to hold the clamp in a condition of stable equilibrium in the position shown with the end of its curved stem pressed in against the felly.

For the purpose of retaining the tire in place all of the bolts are inserted in the felly, and for each one a clamp, such as I have described, is inserted, with its arms beneath the T-head and with its handle resting against the inner edge of the felly. In this position the nut and jam-nut of the bolt are tightened, the tension thus created holding the clamp firmly in place. When now it is desired to remove the tire, the handle on each clamp is grasped, and by pulling it toward the outside of the wheel the cams on the back of the arms of the clamp are drawn across the center line of the bolt and the clamp removed from the wheel. The T-head on each bolt is then turned to a radial position, so as to register with the slots in the flange 3, which may therefore be immediately removed, the T-heads passing through the slots. To replace the flange, the operation is reversed. Ordinarily no loosening of the nut 8 is required to effect this operation, and consequently the removal and replacement of the flange can be effected very much more rapidly than by devices heretofore used.

Having thus described my invention, I claim—

1. A fastening device for a detachable flange of a rubber-tired wheel which consists of a bolt whereby the flange is secured to the felly of the wheel, and a removable clamp, inserted between the flange and the bolt, substantially as described.

2. A fastening device for a detachable flange of a rubber-tired wheel which consists of bolts whereby the flange is secured to the felly of the wheel; T-heads upon said bolts; radial slots in the flange; and removable clamps, inserted between the flange and the T-heads of the bolts, substantially as described.

3. A fastening device for a detachable flange of a rubber-tired wheel which consists of bolts whereby the flange is secured to the felly of the wheel; and a clamp for each bolt having a cam-surface which normally rests in a position of stable equilibrium in relation to the center line of the bolt, but which when removed allows the flange to be detached from the bolt, substantially as described.

4. A device for retaining the rubber tire on a wheel which consists of a removable flange attached to one side of the felly of the wheel by means of bolts; T-heads upon said bolts; radial slots in said flange; and a clamping device for each bolt provided with a yoke-piece the arms of which embrace the ends of the T-head and are provided with cam-surfaces on the side resting against the flange, substantially as described.

In testimony whereof I have hereunto signed my name, at Philadelphia, in the county of Philadelphia and State of Pennsylvania, this 25th day of April, 1904.

CADWALLADER W. KELSEY.

Witnesses:
JAMES H. BELL,
E. L. FULLERTON.